J. WARRENER, Sr.
PITMAN.
APPLICATION FILED MAY 2, 1919.
1,329,645.
Patented Feb. 3, 1920.
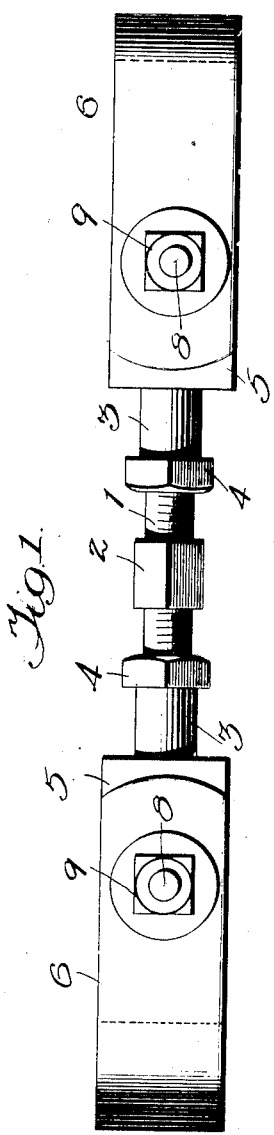
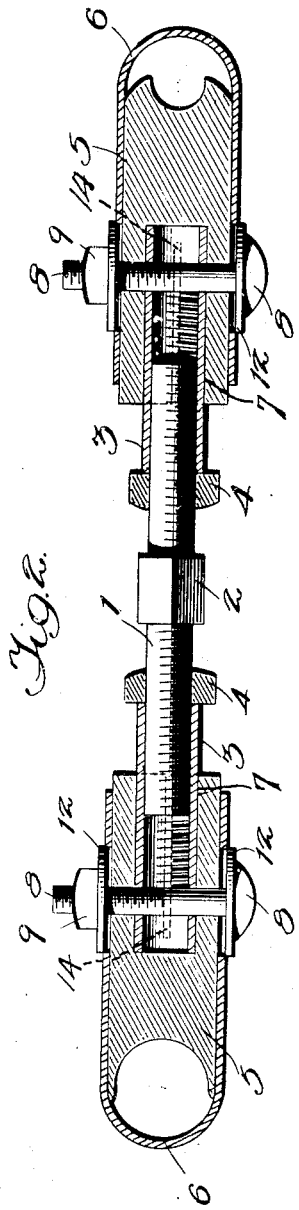
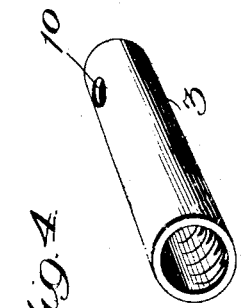
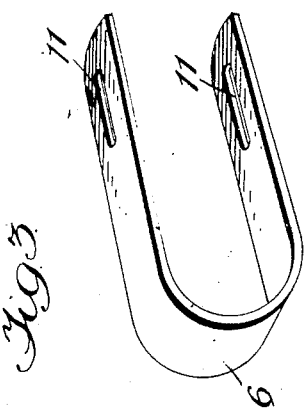
WITNESSES
INVENTOR
JAMES WARRENER, SR.
BY
ATTORNEYS

UNITED STATES PATENT OFFICE.

JAMES WARRENER, SR., OF FALL RIVER, MASSACHUSETTS, ASSIGNOR OF ONE-HALF TO JAMES WARRENER, JR., OF WASHINGTON, DISTRICT OF COLUMBIA.

PITMAN.

1,329,645.  Specification of Letters Patent.  Patented Feb. 3, 1920.

Application filed May 2, 1919. Serial No. 294,164.

*To all whom it may concern:*

Be it known that I, JAMES WARRENER, Sr., a citizen of the United States, and a resident of Fall River, in the county of Bristol and State of Massachusetts, have invented certain new and useful Improvements in Pitmen, of which the following is a specification.

My invention is an improvement in pitmen, and has for its object to provide a device of the character specified especially adapted for use with looms for connecting the reed with its operating mechanism, wherein the pitman is made adjustable to permit compensation for wear.

In the drawings:

Figure 1 is a top plan view of the improved pitman;

Fig. 2 is a longitudinal section;

Fig. 3 is a perspective view of one of the keepers;

Fig. 4 is a similar view of one of the hollow rod sections.

In the present embodiment of the invention a turnbuckle construction is provided, consisting of a rod 1 having its ends oppositely threaded and provided intermediate its ends with a head 2 which is polygonal in cross section to permit the engagement of a wrench therewith to turn the rod.

The ends of the rod are engaged within internally threaded pipe sections 3, and a lock nut 4 is arranged on each end of the rod adjacent to the end of the pipe section for locking said rod from movement with respect to the section after the pipe sections 3 have been adjusted to the proper point.

Each of these pipe sections is connected with a bearing, one of the bearings being adapted for engagement with the reed controlling mechanism, and the other with the operating mechanism for the reed. Each of these bearings consists of a block 5 and a keeper 6, the block being of wood or the like material while the keeper is of metal.

Each keeper is U-shaped as shown, consisting of a body and arms embracing opposite faces of the block, and the outer end of each block is recessed transversely, as shown, to provide with the rounded body portion of the keeper a bearing opening.

Each block has an axial recess 7 in its inner end for receiving the adjacent end of the adjacent pipe section, and a bolt 8 and nut 9 are provided for connecting the keeper to the block and for connecting the block to the pipe section. Each pipe section has a transverse opening 10 at the end remote from the rod 1 for receiving the bolt, and the blocks are slotted or slitted longitudinally, as indicated at 14, in a plane parallel with the wide dimension of the arms of the keeper, the slits or slots extending from one side of the block to the other and providing a degree of resilience, for permitting the block to be clamped on the pipe sections.

The arms of the keeper 6 are longitudinally slotted, as shown at 11, the slots being in register to receive the bolt 8, the said slots registering with the openings through the block and pipe section. Washers 12 are arranged on the bolt between the head and the keeper and between the nut and the keeper as shown. The slots 11 permit the keeper to be adjusted with respect to the block, and with respect to the bolt 8 to compensate for wear of the block, and the blocks may be moved away from each other for the same purpose, thus preserving a uniform distance between the operating mechanism and the reed.

In use, the blocks and keepers are connected with the moving elements. With the parts in the position of Fig. 1 it will be obvious that by turning the rod 1 an adjustment may be had that will insure an even laying of the thread by the reed during weaving. In addition, the improved crank arm or pitman may be adjusted to any desired length to fit different looms. All of the elements except the blocks are of metal and when the blocks become worn they can be replaced at very slight expense.

By the use of the improved pitman, that is, by providing proper adjustment, there will be no thin or thick places in the cloth nor will the weaver have the trouble of picking out misplaced threads.

I claim:

1. A pitman of the character specified comprising wooden blocks and U-shaped keepers embracing the blocks, internally threaded pipe sections connected with the blocks, and a rod having its ends threaded in opposite directions and engaging the pipe sections to move them toward or from each other, and a lock nut on the rod at the inner end of each pipe section, each keeper comprising a curved body and arms extending substantially parallel and longitudinally slotted, the blocks and pipe sections having registering openings adapted to register with the slots, a bolt passing through the slots and openings, and a nut engaging the bolt.

2. A pitman of the character specified comprising wooden blocks and U-shaped keepers embracing the blocks, internally threaded pipe sections connected with the blocks and a rod having its ends threaded in opposite directions and engaging the pipe sections to move them toward or from each other, and a lock nut on the rod at the inner end of each pipe section.

JAMES WARRENER, Sr.

Witnesses:
JOHN F. CALLERY,
MICHAEL J. FINK.